United States Patent [19]

Harada et al.

[11] Patent Number: 4,873,596
[45] Date of Patent: Oct. 10, 1989

[54] MAGNETIC DISK DRIVE APPARATUS

[75] Inventors: Tsutomu Harada, Tamana; Yasushi Okamura, Yamaga, both of Japan

[73] Assignee: Matsushita Electric Industrial Co., Ltd., Osaka, Japan

[21] Appl. No.: 112,163

[22] Filed: Oct. 26, 1987

[30] Foreign Application Priority Data

Oct. 27, 1986 [JP] Japan .................................. 61-255080
Oct. 29, 1986 [JP] Japan .................................. 61-257263

[51] Int. Cl.⁴ ...................... G11B 17/02; G11B 5/016; G11B 5/55; G11B 21/08
[52] U.S. Cl. ............................... 360/99.11; 360/99.04; 360/106
[58] Field of Search .................................. 360/97-99, 360/105, 106, 99.11, 99.08, 99.04

[56] References Cited

U.S. PATENT DOCUMENTS

| 4,352,133 | 9/1982 | Hager | 360/106 |
| 4,359,763 | 11/1982 | Hoffman | 360/99 |
| 4,661,735 | 4/1987 | Miki et al. | 360/97 |
| 4,665,453 | 5/1987 | Mikamoto et al. | 360/97 |
| 4,680,655 | 7/1987 | Sugawara | 360/97 |
| 4,742,408 | 5/1988 | Kumagi | 360/97 |
| 4,747,003 | 5/1988 | Tezuka | 360/106 |

Primary Examiner—John H. Wolff
Assistant Examiner—Matthew J. Bussan
Attorney, Agent, or Firm—Pollock, Vande Sande & Priddy

[57] ABSTRACT

A magnetic disk drive apparatus includes a base plate and a first motor mounted on the base plate. The first motor has a rotatable shaft engageable with a magnetic disk for rotating the magnetic disk. A carrier has a central opening through which the shaft of the first motor extends. A magnetic head fixed to the carrier is engageable with the magnetic disk. Opposite sides of the carrier is slidably supported on the base plate. A second motor mounted on the base plate has a rotatable shaft. The carrier and the shaft of the second motor are coupled so that the carrier slides linearly in accordance with rotation of the shaft of the second motor.

3 Claims, 2 Drawing Sheets

4,873,596

MAGNETIC DISK DRIVE APPARATUS

BACKGROUND OF THE INVENTION

This invention relates to an apparatus for driving a magnetic disk in a storage unit.

Magnetic disk storage units are widely used in computers, word processors, or the like. The storage units include magnetic disk drive apparatuses. The trend toward smaller computers and word processors requires smaller magnetic disk drive apparatuses.

SUMMARY OF THE INVENTION

It is an object of this invention to provide a compact magnetic disk drive apparatus.

A magnetic disk drive apparatus according to a first aspect of this invention includes a base plate and a first motor mounted on the base plate. The first motor has a rotatable shaft engageable with a magnetic disk for rotating the magnetic disk. A carrier has a central opening through which the shaft of the first motor extends. A magnetic head fixed to the carrier can contact with the magnetic disk. Opposite sides of the carrier are slidably supported on the base plate. A second motor mounted on the base plate has a rotatable shaft. The carrier and the shaft of the second motor are coupled so that the carrier slides linearly in accordance with rotation of the shaft of the second motor.

A magnetic disk drive apparatus according to a second aspect of this invention includes a base plate made of magnetic metal, and first and second motor shafts rotatably supported on the base plate. First and second rotors are mounted on the first and second motor shafts respectively. First and second exciting coils fixed to the base plate oppose the first and second rotors respectively. The first motor shaft and a magnetic disk are engageable so that the magnetic disk can rotate in accordance with rotation of the first motor shaft. A carrier has a central opening through which the first motor shaft extends. A magnetic head mounted on the carrier can contact with the magnetic disk. Opposite sides of the carrier are slidably supported on the base plate. The second motor shaft and the carrier are coupled so that the carrier moves linearly in accordance with rotation of the second motor shaft.

A magnetic disk drive apparatus according to a third aspect of this invention includes a base plate and printed wiring films extending on a first surface of the base plate. A first motor connected to the printed wiring films has a rotatable shaft which extends through the base plate and which projects from a second surface of the base plate opposite the first surface of the base plate. The shaft of the first motor is engageable with a magnetic disk. A second motor connected to the wiring films has a rotatable shaft which extends through the plate and which projects from the second surface ne base plate. Electronic parts are arranged on the iring films. A carrier opposes the second surface of the base plate. A magnetic head mounted on the carrier can contact with the magnetic disk. Opposite sides of the carrier are slidably supported on the base plate. The shaft of the second motor and the carrier are coupled so that the carrier moves linearly in accordance with rotation of the shaft of the second motor.

DESCRIPTION OF THE PREFERRED EMBODIMENT

Figure 1:
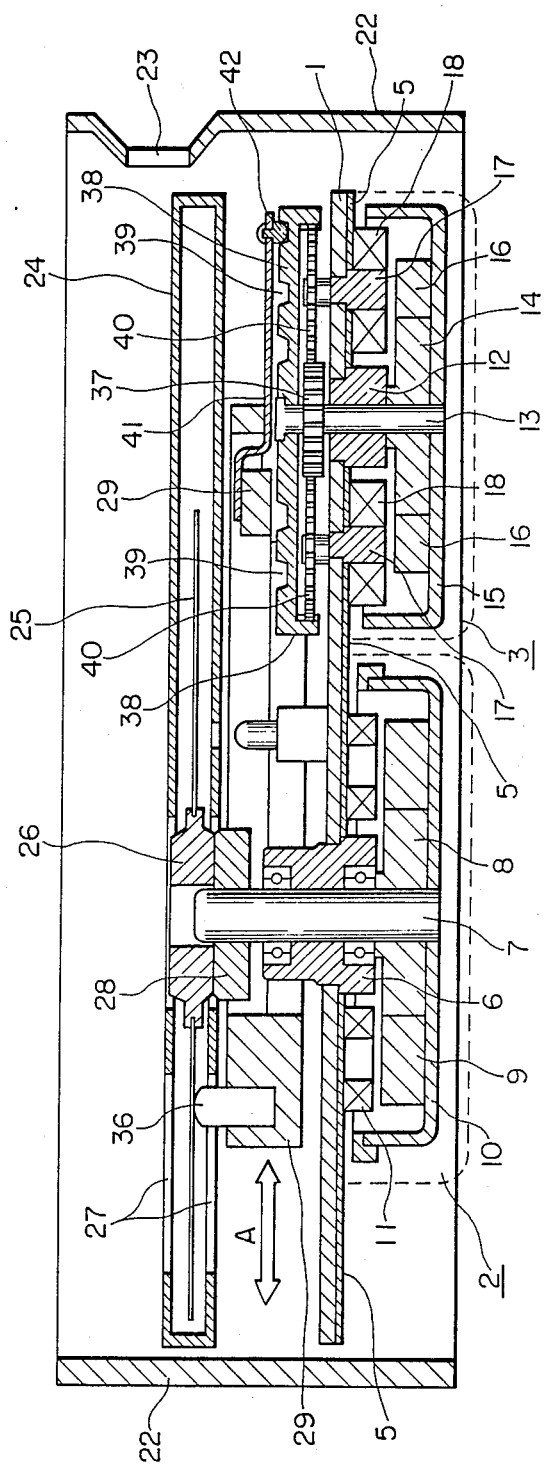
FIG. 1 is a sectional view of a magnetic disk drive apparatus according to an embodiment of this invention.
Figure 2:
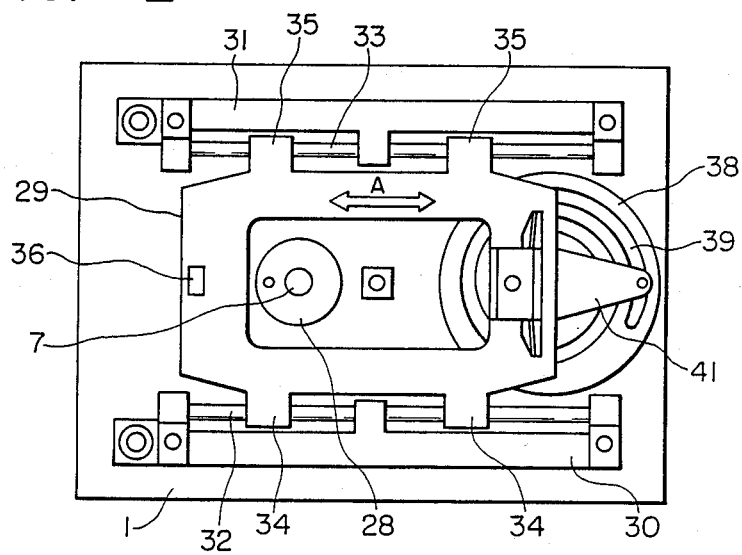
FIG. 2 is a plan view of the magnetic disk drive apparatus of FIG. 1.

With reference to FIGS. 1 and 2, a magnetic disk drive apparatus includes a base plate 1 preferably made of magnetic metal such as iron. A magnetic disk rotating motor 2 and a magnetic head moving motor 3 are supported by the base plate 1. One surface of the base plate 1 is coated with a layer 5 of insulating material. Terminals for supplying drive currents to the motors 2 and 3, terminals for fixing electronic parts, and printed wiring films extending between the terminals are formed on the insulating layer 5.

Figure 3:
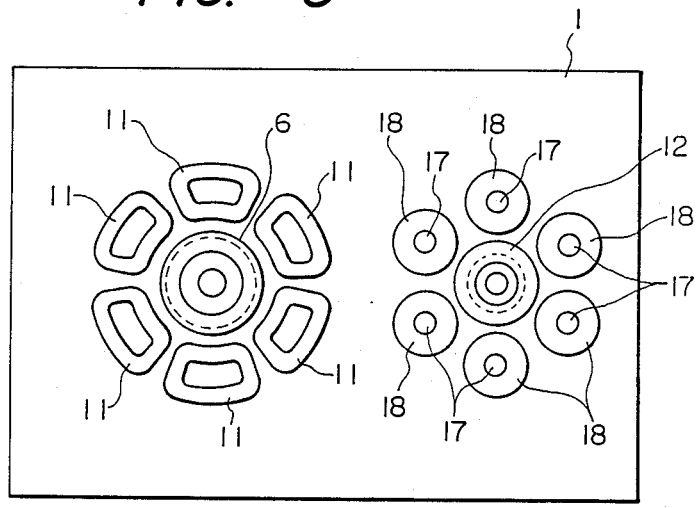
FIG. 3 is a plan view of the base plate and the magnetic coils in the magnetic disk drive apparatus of FIG. 1.

The magnetic disk rotating motor 2 is preferably composed of a spindle motor. The motor 2 includes a bearing 6 supported by the base plate 1. A motor shaft 7 is rotatably supported by the bearing 6. A rotor fixing member 8 is secured to one end of the motor shaft 7. A permanent magnet 9 is attached to the rotor fixing member 8. The rotor fixing member 8 and the permanent magnet 9 are accommodated in a rotor casing 10 secured to the rotor fixing member 8. Exciting coils 11 fixed on the insulating layer 5 oppose the permanent magnet 9. As shown in FIG. 3, the exciting coils 11 are arranged around the bearing 6 at equal angular intervals. When driving currents are supplied to the exciting coils 11, the motor shaft 7 rotates.

The magnetic head moving motor 3 is preferably of the stepping type. The motor 3 includes a bearing 12 supported by the base plate 1. A motor shaft 13 is rotatably supported by the bearing 12. A rotor fixing member 14 is secured to one end of the motor shaft 13. A permanent magnet 16 is attached to the rotor fixing member 14. The rotor fixing member 14 and the permanent magnet 16 are accommodated in a rotor casing 15 secured to the rotor fixing member 14. Stator magnetic cores 17 fixed on the base plate 1 oppose the permanent magnet 16. The magnetic cores 17 extend into the base plate 1 through the insulating layer 5. Exciting coils 18 fixed on the insulating layer 5 extend around the respective magnetic cores 17. As shown in FIG. 3, the sets of the magnetic cores 17 and the exciting coils 18 are arranged around the bearing 12 at equal angular intervals. When driving currents are supplied to the exciting coils 18, the motor shaft 13 rotates.

Since the shafts 7 and 13 of the magnetic disk rotating motor 2 and the magnetic head moving motor 3 project from the common base plate 1 in the same direction, the shafts 7 and 13, and the associated bearings 6 and 12 can be parallely inserted in the same direction during assembly. Accordingly, the magnetic disk rotating motor 2 and the magnetic head moving motor 3 are assembled simultaneously in same steps during manufacture so that the number of necessary steps of manufacture is reduced. Ends or terminals of the exciting coils 11 and 18 are directly connected to the printed wiring films.

These direct connections reduce the number of necessary parts.

Figure 4:
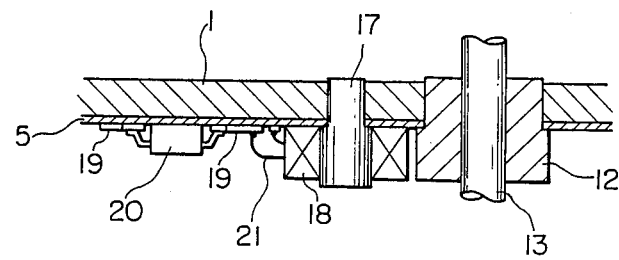
FIG. 4 is a sectional view of the base plate and the parts in the magnetic disk drive apparatus of FIG. 1.

As shown in FIG. 4, printed wiring metal films 19 extend on the insulating layer 5. The exciting coils 18 are connected to the wiring metal films 19 via leads 21. Semiconductor devices 20 for controlling the magnetic head moving motor 3 are connected between the wiring metal films 19. The control devices 20 are connected to the exciting coils 18 via the wiring metal films 19 and the leads 21.

As shown in FIG. 1, the magnetic disk drive apparatus includes a frame 22 made of resin. The frame 22 is annular, having a op opening and a bottom opening. The wall of the frame 22 forming a front of the magnetic disk drive apparatus has an opening 23 via which a floppy disk cartridge is inserted into and removed from the drive apparatus.

The floppy disk cartridge preferably includes a hard casing 24 and a disk 25 accommodated within the casing 24. The disk 25 is supported by a central hub 26 so that the disk 25 rotates together with the central hub 26. The casing 24 has openings 27 which allow access to the disk 25.

When the floppy disk cartridge is inserted into the magnetic disk drive apparatus via the front opening 23, the floppy disk cartridge is held by a disk holder (not shown) and is then moved downward together with the holder. A central hub holder 28 is fixed to the shaft 7 of the magnetic disk rotating motor 2. As the floppy disk cartridge is moved downward, the central hub 26 of the disk 25 engages the central hub holder 28 on the shaft 7 of the magnetic disk rotating motor 2 so that the disk 25 is mechanically coupled to the motor shaft 7. In the case where the disk 25 is coupled to the motor shaft 7, the disk 25 rotates together with the motor shaft 7.

A carrier 29 made of synthetic resin is in the form of a frame having a central opening. The carrier 29 is movably supported on the base plate 1 via supporting members 30 and 31 which are mounted on the base plate 1. The supporting members 30 and 31 are provided with guide shafts 32 and 33 respectively. Opposite sides of the carrier 29 have engagement projections 34 and 35 formed with guide holders through which the guide shafts 32 and 33 extend. The carrier 29 can slide along the guide shafts 32 and 33. The length of a spiral groove 39 which will be described hereinafter determines a full stroke or a movable range of the carrier 29. The motor shaft 7 of the magnetic disk rotating motor 2 extends through the central opening of the carrier 29. A portion of the central hub holder 28 is accommodated in the central opening of the carrier 29. The central opening of the carrier 29 is designed so that the walls of the carrier 29 will not meet the central hub holder 28 as the carrier 29 moves through its full stroke. A magnetic head 36 is fixed to an end of the carrier 29 so that the magnetic head 36 moves together with the carrier 29. When the floppy disk cartridge is placed in position within the magnetic disk drive apparatus, the magnetic head 36 extends into the floppy disk hard casing 24 via the opening 27 and contacts the disk 25.

A gear 37 is fixedly mounted on the shaft 13 of the magnetic head moving motor 3. A disk 38 is rotatably supported on a distal end of the motor shaft 13. An upper surface of the disk 38 has a spiral groove 39. Gears 40 disposed below the disk 38 are rotatably supported on respective shafts fixed to the base plate 1. The gears 40 mesh with the gear 37 and also with teeth formed on inner side surfaces of the disk 38. A rotational force can travel from the motor shaft 13 to the disk 38 via the combination of the gears 37 and 40, and the teeth on the disk 38. As the motor shaft 13 rotates, the disk 38 rotates at a reduced speed.

An engagement member 41 composed of a leaf spring has one end fixed to the carrier 29. The other end of the engagement member 41 is provided with a projection 42 fitting into the spiral groove 39 in the disk 38. The combination of the engagement member 41 and the spiral groove 39 converts a rotational motion into a linear motion. As the disk 38 rotates, the projection 42 on the engagement member 41 relatively slides along the spiral groove 39, linearly moving the engagement member 41 and thus linearly moving the carrier 29 and the magnetic head 36. Accordingly, the carrier 29 and the magnetic head 36 move linearly along the arrows A of FIG. 1 in accordance with rotation of the shaft 13 of the magnetic head moving motor 3.

The size of the base plate 1 is approximately equal to the size of the hard casing 24 of the floppy disk cartridge. The motors 2 and 3 are preferably of the flat types. This design allows the magnetic disk drive apparatus to be compact. In addition, the carrier 29 in the form of a frame allows mechanical coupling between the magnetic head 36 and the magnetic head moving motor 3 over the magnetic disk rotating motor 2 without undesirably increasing the depth of the magnetic disk drive apparatus. As understood from the previous description, the motors 2 and 3 are formed in common on the same base plate 1. This design also allows the magnetic disk drive apparatus to be compact.

What is claimed is:

1. An apparatus for driving a magnetic disk, comprising:
   (a) a base plate made of magnetic metal;
   (b) first and second motor shafts rotatably supported on the base plate;
   (c) first and second rotors mounted on the first and second motor shafts respectively;
   (d) first and second exciting coils fixed to the base plate and opposing the first and second rotors respectively;
   (e) means for connecting the first motor shaft and the magnetic disk and allowing the magnetic disk to rotate in accordance with rotation of the first motor shaft;
   (f) a carrier having a central opening through which the first motor shaft extends;
   (g) a magnetic head mounted on the carrier and able to contact the magnetic disk;
   (h) means for slidably supporting opposite sides of the carrier on the base plate;
   (i) means for coupling the second motor shaft and the carrier and allowing the carrier to move linearly in accordance with rotation of the second motor shaft; and
   printed wiring films extending on a surface of the base plate and provided with terminals, and electronic parts connected to the printed wiring films, the first and second exciting coils being fixed to the surface of the base plate and electrically connected to the terminals.

2. An apparatus for driving a magnetic disk, comprising:
   (a) a base plate;
   (b) printed wiring films extending on a first surface of the base plate;

(c) a first motor connected to the printed wiring films and having a rotatable shaft which extends through the base plate and which projects from a second surface of the base plate opposite the first surface of the base plate, the shaft of the first motor being engageable with the magnetic disk;

(d) a second motor connected to the wiring films and having a rotatable shaft which extends through the base plate and which projects from the second surface of the base plate;

(e) electronic parts arranged on the wiring films;

(f) a carrier opposing the second surface of the base plate;

(g) a magnetic head mounted on the carrier and able to contact the magnetic disk;

(h) means for slidably supporting opposite sides of the carrier on the base plate; and (i) means for coupling the shaft of the second motor and the carrier and allowing the carrier to move linearly in accordance with rotation of the shaft of the second motor;

wherein the printed wiring films are operative to transmit drive currents to the first and second motors.

3. The apparatus of claim 2 wherein the coupling means comprises a first member having a spiral groove, means for rotating the first member at a reduced speed as the shaft of the second motor rotates, and a second member having a first end fixed to the carrier and a second end fitting into the spiral groove.

* * * * *